United States Patent
Logan et al.

(10) Patent No.: US 6,606,436 B2
(45) Date of Patent: Aug. 12, 2003

(54) STRENGTHENED FIBER OPTIC CABLE

(75) Inventors: Eric R. Logan, Hickory, NC (US); Richard S. Wagman, Hickory, NC (US); Jason C. Lail, Hickory, NC (US); Michael J. Gimblet, Taylorsville, NC (US)

(73) Assignee: Corning Cable Systems LLC, Hickory, NC (US)

( * ) Notice: Subject to any disclaimer, the term of this patent is extended or adjusted under 35 U.S.C. 154(b) by 150 days.

(21) Appl. No.: 09/776,421

(22) Filed: Feb. 2, 2001

(65) Prior Publication Data

US 2002/0044751 A1 Apr. 18, 2002

Related U.S. Application Data

(62) Division of application No. 09/150,856, filed on Sep. 10, 1998, now Pat. No. 6,259,844.

(51) Int. Cl.[7] .................................. G02B 6/44
(52) U.S. Cl. ........................ 385/113; 385/114
(58) Field of Search ............................... 385/100, 114

(56) References Cited

U.S. PATENT DOCUMENTS

| | | | | |
|---|---|---|---|---|
| 4,241,979 A | 12/1980 | Gagen et al. | ............ | 350/96.23 |
| 4,730,894 A | 3/1988 | Arroyo | ............ | 350/96.23 |
| 4,765,712 A | 8/1988 | Bohannon, Jr. et al. | . | 350/96.23 |
| 4,770,489 A | 9/1988 | Saito et al. | ............ | 350/96.23 |
| 4,844,575 A | 7/1989 | Kinard et al. | ............ | 350/96.23 |
| 4,946,237 A | 8/1990 | Arroyo et al. | ............ | 350/96.23 |
| 5,029,974 A | 7/1991 | Nilsson | ............ | 350/96.23 |
| 5,043,538 A | 8/1991 | Hughey, Jr. et al. | ........ | 174/107 |
| 5,109,457 A | 4/1992 | Panuska et al. | ............ | 385/102 |
| 5,384,880 A | 1/1995 | Keller et al. | ............ | 385/109 |
| 5,509,097 A | 4/1996 | Tondi-Resta et al. | ....... | 385/113 |
| 5,619,606 A | 4/1997 | Bonicel | ............ | 385/102 |
| 5,740,295 A | 4/1998 | Kinard et al. | ............ | 385/109 |
| 5,748,823 A | * 5/1998 | Nave | ............ | 174/121 A |
| 5,852,698 A | * 12/1998 | Bringuier | ............ | 385/109 |
| 6,101,305 A | * 8/2000 | Wagman et al. | ............ | 385/113 |

FOREIGN PATENT DOCUMENTS

| | | | | |
|---|---|---|---|---|
| EP | 0484687 A2 | 5/1992 | ............ | G02B/6/44 |
| EP | 0676654 A2 | 10/1995 | ............ | G02B/6/44 |
| EP | 0685855 A1 | 12/1995 | ............ | H01B/7/28 |
| FR | 2736730 | 1/1997 | ............ | G02B/6/44 |
| JP | 07104156 A | 4/1995 | ............ | G02B/6/44 |
| JP | 08171034 A | 7/1996 | ............ | G02B/6/44 |
| JP | 08211241 A | 8/1996 | ............ | G02B/6/17 |

OTHER PUBLICATIONS

"AT&T 216 Fiber LXE Accuribbon"; admitted date 1993.
Siecor Cable Product Code Guidebook Jul. 1997; "STT–Ribbon Cables (12–216 Fibers)"; pp. 16–17.

* cited by examiner

Primary Examiner—Hung N. Ngo
(74) Attorney, Agent, or Firm—Timothy J. Aberle

(57) ABSTRACT

A fiber optic cable having strength assemblies (30) adjacent a tube having at least one optical fiber therein, at least one of the strength assemblies including a strength member for imparting crush resistance to the cable. The strength member is generally coupled to a first jacket, and may be surrounded by a single jacket, or by an armor tape and a second jacket. The strength member may be disposed in a recess of the tube. When crush loads are applied to the fiber optic cable, the stresses created in the cable are advantageously distributed by strength assemblies (30) whereby stress concentrations and undue deflection of the cable in response to the crush loads are avoided. The arrangement of the cable components and strength assemblies (30) inhibits slippage and/or warping of the components under stress, and thereby evenly distributes the stress for preventing crush induced attenuation in the optical fibers.

42 Claims, 3 Drawing Sheets

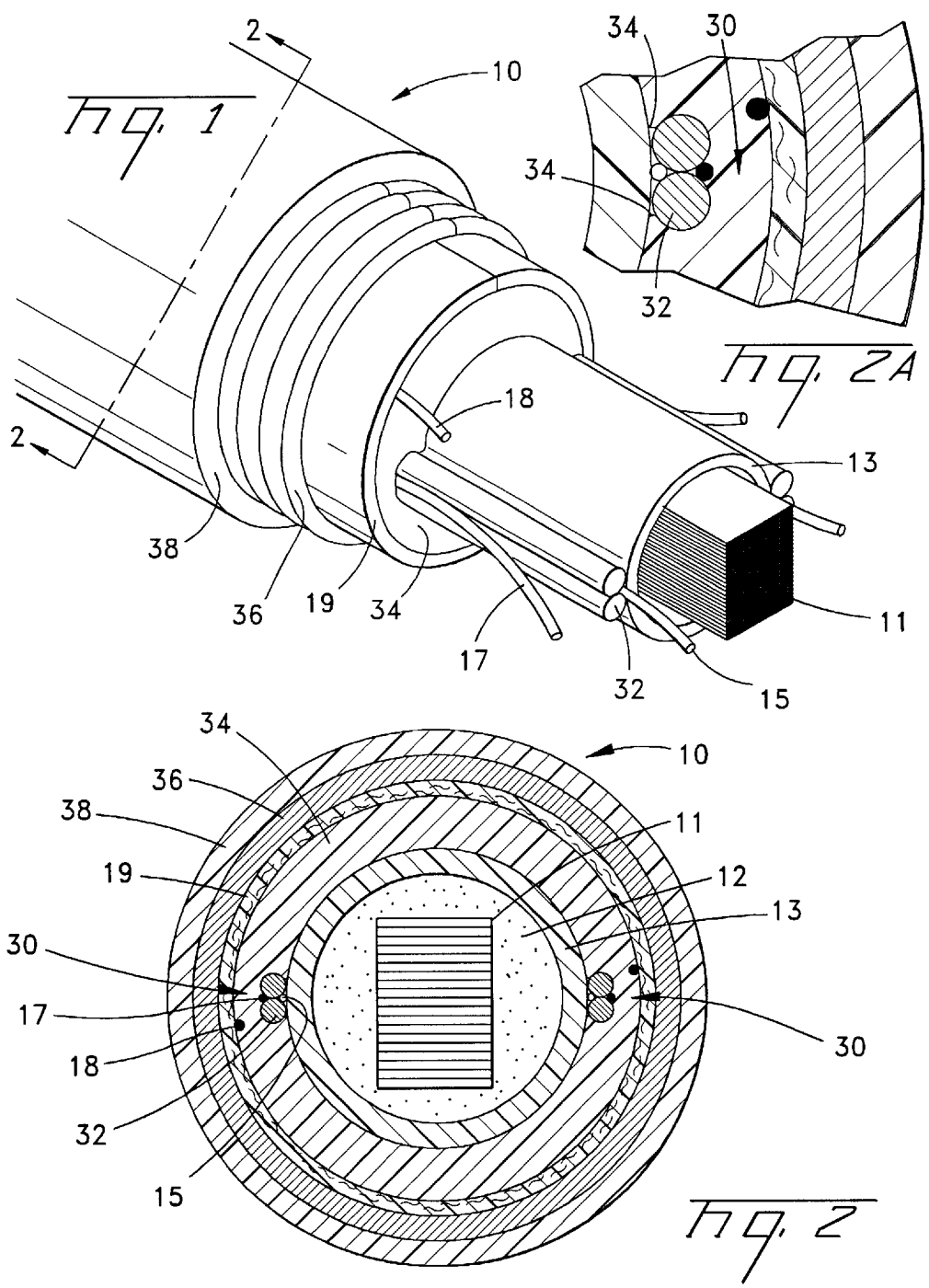

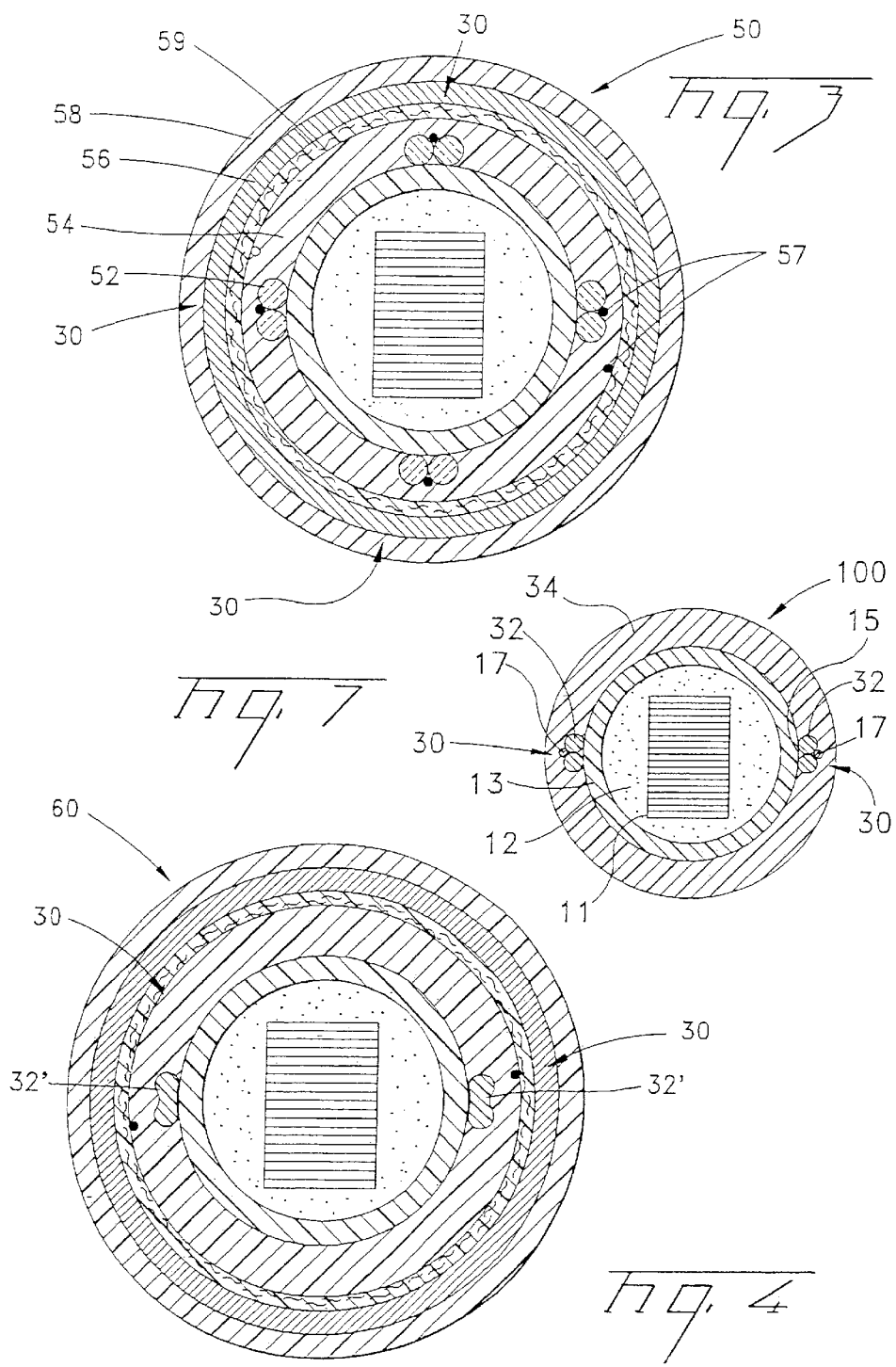

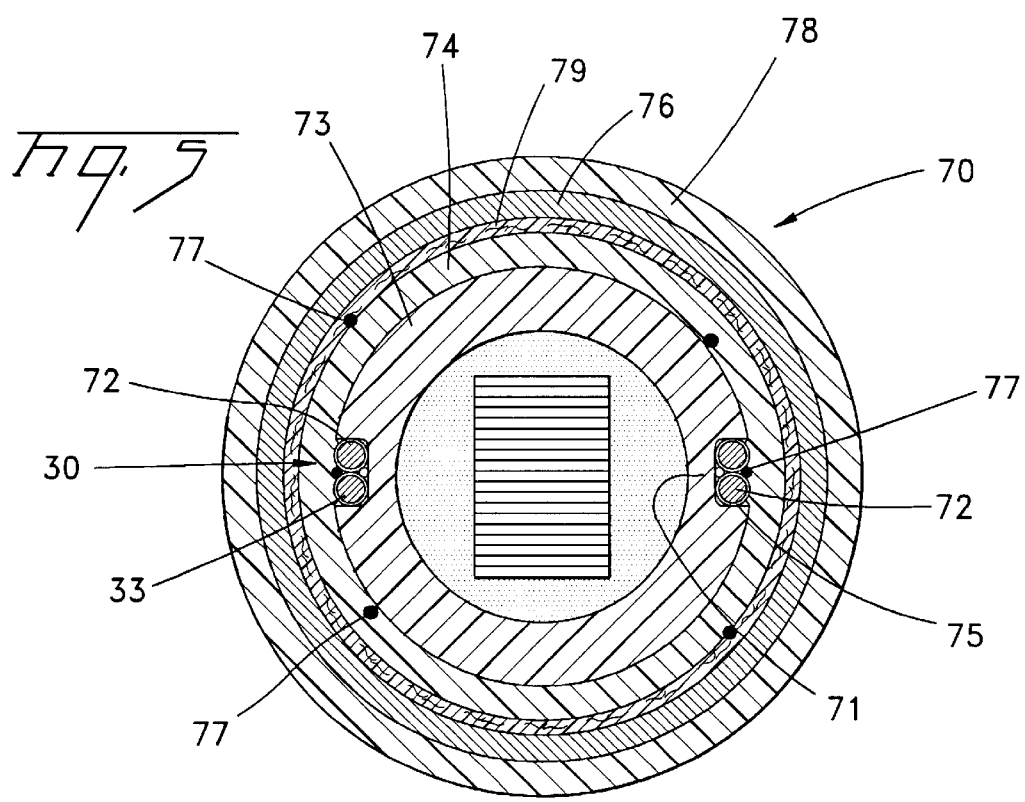
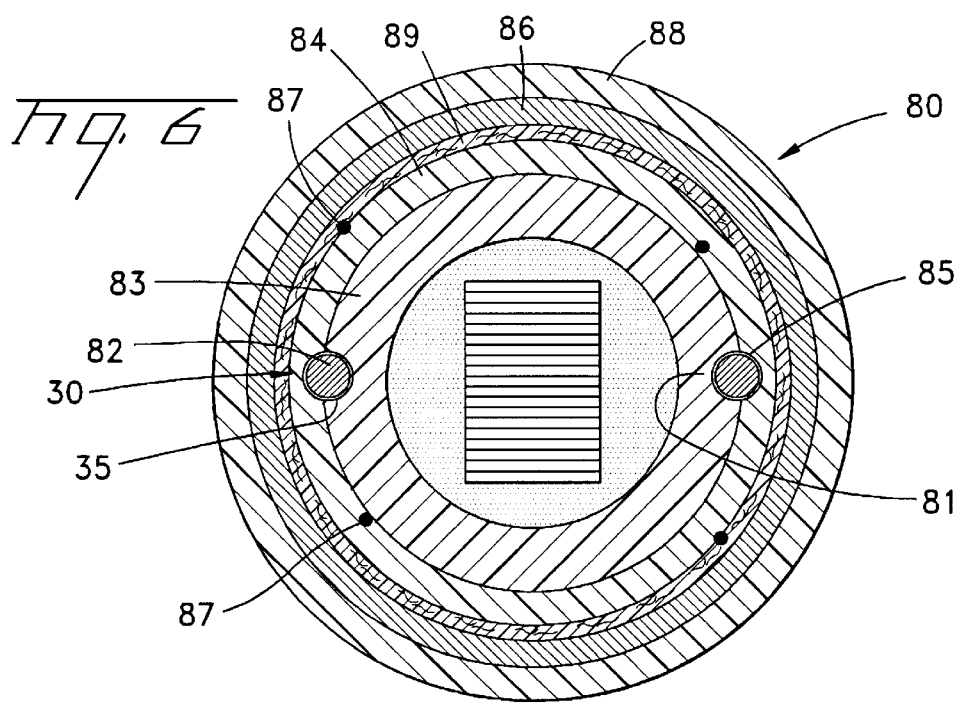

ic cable, and,
STRENGTHENED FIBER OPTIC CABLE

This is a divisional application of Ser. No. 09/150,856 filed Sep. 10, 1998, now U.S. Pat. No. 6,259,844, the contents of which is hereby incorporated by reference.

The present invention is a Continuation-in-Part of pending Ser. No. 09/150,856 filed Sep. 10, 1998.

The present invention relates to fiber optic cables, and, more particularly, to fiber optic cables of the type having at least one strength member.

Conventional fiber optic cables include optical fibers that conduct light which is used to transmit voice, video, and data information. Where the fiber optic cable is subjected to crushing forces, the optical fibers may be stressed and attenuation of the transmitted light may occur. It is therefore important for fiber optic cables to be constructed in a robust manner whereby attenuation due to crush induced stresses can be avoided. Additionally, although it is desirable for a fiber optic cable to have a high optical fiber count, it is also desirable for the cable to be as compact as possible.

Conventional fiber optic cables should be able to withstand longitudinal compression and tension, and they typically include strength members for these purposes. However, the strength members may disadvantageously affect cable bending performance during installation, and may hinder optical fiber access. A fiber optic cable having strength members located in a single plane generally will experience a preferential bending action favoring bending of the cable out of the plane defined by the strength members. On the other hand, a fiber optic cable having strength members at spaced locations encircling the center of the cable will not have a preferential bend, but the strength members typically include a helical lay so that the cable can be bent. Even taking into account the helical lay of the strength members, when bent in generally any axis, cables of the non-preferential bend type may be very stiff, a characteristic which may be highly undesirable depending upon installation requirements. Thus a cable of the preferential bend type will typically experience ease of cable bending in a preferred axis, and, as there are less strength members to deal with, may present a less time consuming optical fiber access procedure. A cable designer may therefore balance the need to have sufficient cable components for resisting crush, compression, and tension loads, against the size and stiffness contributions of the cable components that may render the cable difficult to install in a cable passageway.

An example of a known preferential bend type fiber optic cable is disclosed in U.S. Pat. No. 5,509,097. This known cable requires a hot melt adhesive or epoxy which bonds the strength members to a core tube. The adhesive/epoxy may be combined with a helically wound tape or cord wrapped about the strength members under tension, thereby applying radially inward forces to the strength members and forcing the strength members against the tube. Due to the size and stiffness contributions of the cable components, this known cable may be undesirably stiff for some cable installations. Additionally, the cord, tape, and adhesive/epoxy add expense to the cable product and may complicate/slow the manufacturing process. Moreover, large gaps exist adjacent the strength members between the jacket and the core tube which may negatively affect the crush performance of the cable.

An example of a known non-preferential bend type fiber optic cable is disclosed in U.S. Pat. No. 4,730,894, which is incorporated by reference herein in its entirety. This known cable includes a layer of strength members adhesively bonded to a plastic tape and wrapped about a core tube; however, the cable may be undesirably stiff for some cable installations. Additionally, the plastic tape and adhesive add size and expense to the cable product and may complicate/slow the manufacturing process. Moreover, the lack of a tight coupling between the plastic tape and the core tube may negatively affect the crush performance of the cable. Other non-preferential bend type cables may be expensive and/or undesirably stiff as they include, in addition to a core tube, a helically grooved outer tube having helically laid trapezium shaped reinforcing members bonded thereto. The reinforcing members are made of a material that weakly bonds to the slotted rod.

OBJECTS OF THE INVENTION

It is an object of the present invention to provide a fiber optic cable having at least one optical fiber in a tube and strength assemblies adjacent the tube for imparting crush resistance to the cable. The strength assemblies may include at least two opposed strength members imparting a preferential bend resistance to the optical cable, at least one of the strength members being in contact with a first jacket, and being surrounded by an armor tape and a second jacket.

It is another object of the invention to provide a fiber optic cable having: at least one optical fiber in a tube; strength assemblies respectfully comprising at least one strength member in contact with a jacket and adjacent the tube; at least one ripcord generally aligned with a bending axis of the cable and generally in contact with at least one of the strength members; whereby crush loads applied to the cable create stresses therein which flow to the jacket and to the strength members.

It is an object of the invention to provide a fiber optic cable having: at least one optical fiber in a tube; strength assemblies each respectively comprising at least two longitudinally disposed strength members generally in contact with each other; at least a first jacket surrounding the tube, at least some of the strength members generally in contact with the at least first jacket; and at least one ripcord disposed generally between two of the strength members of a strength assembly and generally longitudinally aligned with the strength members.

BRIEF DESCRIPTION OF THE DRAWING FIGURES

FIG. 1 is an isometric view of a fiber optic cable according to the present invention.

FIG. 2 is a cross sectional view of the cable of FIG. 1 taken at line 2—2.

FIG. 2A is an enlarged view of a section of the fiber optic cable of FIGS. 1 and 2.

FIG. 3 is a cross sectional view of a fiber optic cable according to a second embodiment of the present invention.

FIG. 4 is a cross sectional view of a fiber optic cable according to a third embodiment of the present invention.

FIG. 5 is a cross sectional view of a fiber optic cable according to a fourth embodiment of the present invention.

FIG. 6 is a cross sectional view of a fiber optic cable according to a fifth embodiment of the present invention.

FIG. 7 is a cross sectional view of a fiber optic cable according to the present invention.

DETAILED DESCRIPTION OF THE INVENTION

The present invention is directed to a fiber optic cable having strength assemblies for resisting crush loads. When crush loads are applied to the fiber optic cable of the present invention, the stresses created in the cable are advantageously distributed by the strength assemblies. Tight coupling and minimized gaps between the cable components in the strength assemblies inhibit slippage and/or warping of the components under stress, and thereby evenly distribute the crush induced stress to minimize attenuation in the optical fibers.

Referring to FIGS. 1, 2 and 2A, a fiber optic cable 10 according to a first embodiment of the present invention will be described. Fiber optic cable 10 includes a stack of optical fiber ribbons 11, e.g., a stack of twenty-four fiber ribbons, that can be surrounded by a waterblocking blocking substance 12 in the form of a waterblocking grease or a dry, superabsorbent substance. A core tube 13 surrounds waterblocking substance 12 and optical fiber ribbons 11, and is preferably formed of one or more conventional plastics that are compatible with waterblocking substance 12.

Fiber optic cable 10 includes one or more strength assemblies 30 for resisting crush and longitudinal compression and tension forces. A typical strength assembly (FIG. 2A) 30, which is supported by core tube 13, includes one or more strength members, and may include portions of a first plastic jacket, an armor tape, and a second plastic jacket. For example, in the embodiment of FIGS. 1–2, strength assembly 30 may include one or more longitudinally disposed strength members 32, a portion of a first jacket 34, a portion of a corrugated or flat armor tape 36 of the metallic or plastic type, and a portion of a second jacket 38. Jacket 34 may, however, comprise the exterior surface of the cable, as described with reference to the embodiment shown in FIG. 7. At least two strength members 32, located on opposite sides of core tube 13, can be disposed in contact with tube 13 thereby imparting a preferential bend resistance to fiber optic cable 10. At least one of strength assemblies 30 includes a strength member 32 coupled to first jacket 34; however, all strength members should be coupled to jacket 34. A thin waterblocking layer 19, for example a conventional waterblocking tape, is disposed between first and second jackets 34,38. Alternatively, waterblocking layer 19 may be a water swellable coating deposited on tape 36. Ripcords 17 and 18 may be placed along strength members 32 and adjacent tape 36, respectively.

Strength members 32 can be made of a pre-formed metallic material, e.g., steel, or a dielectric material, e.g., glass reinforced plastic. In addition, the preferred material for the strength members is one which produces a minimum of hydrogen at high temperatures. Strength members 32 preferably include a coating of a water swellable material, for example a conventional superabsorbent substance mixed with a plastic carrier. Preferably, a given strength assembly 30 typically includes two or more strength members 32 that can be coupled to each other by action of the water swellable material, and can be coupled to jacket 34. As an alternative or in addition to the water swellable material mixture, waterblocking yarns 15 may be disposed along strength members 32.

Cables made according to the present invention define a robust, crush resistant construction. Jacket 34 is preferably extruded on and bonds with strength members 32 and tube 13 for a tightly coupled arrangement without substantial gaps. A conventional pressure or a vacuum extrusion process is suitable. The material of jacket 34 is substantially bonded to the water swellable coating on strength members 32, surrounds at least about half of the outer surface of a given strength member 32, and fills in the interstices between the strength members and tube 13 with minimized gaps therebetween (FIG. 2A). Next, tapes 19 and 36 are tightly wrapped around first jacket 34, and second jacket 38 is extruded onto tape 36, which tape includes a thin coating of a conventional glue or a conventional controlled bonding layer having layers of plastic that provide controlled adhesion between jacket 38 and tape 36. Post extrusion shrinkage of the jackets may enhance coupling between the components. During manufacture of fiber optic cable 10, the water swellable coating on the strength members 32 may obviate the need for water swellable yarns thereby making the manufacturing process less complicated.

When crush loads are applied to a fiber optic cable according to the present invention, the stresses created in the cable are advantageously distributed by strength assemblies 30 whereby stress concentrations and undue deflection of the cable in response to the crush loads are avoided. In other words, the tight coupling and minimized gaps between the cable components in strength assemblies 30 inhibit slippage and/or undue warping of the components under stress, and thereby evenly distribute the stress for preventing crush induced attenuation in the optical fibers of optical fiber ribbons 11. As noted above, core tube 13 supports strength assemblies 30. In addition to providing resistance to crush forces, the components of strength assembly 30 perform their usual functions, for example, first and second jackets 34,38 and tape 36 surround and protect tube 13 from rodent attack, moisture, mechanical damage, etc.

The invention may be practiced in the form a fiber optic cable 50 of the non-preferential bend type (FIG. 3). Cable 50 includes a series of strength assemblies 30 preferably helically or longitudinally disposed about the center of the cable. Additionally, as in the first embodiment of the present invention, cable 50 includes a first jacket 54, a waterblocking tape 59, an armor tape 56, and a second jacket 58. Ripcords 57 are provided to assist removal of the cable components. To simplify the manufacturing process, the present invention may be practiced in the form of a fiber optic cable 60 (FIG. 4) having pre-formed, non-circular strength members 32' coated with a water swellable material as described above. Strength members 32' include an arcuate surface shape, for example a concave shape, that is generally complementary to the convex arcuate surface shape of tube 13. Strength members 32' may include arcuate surface shapes that interface with a jacket. The complementary shape helps to reduce the overall cable size contribution due to the strength members.

Further, the invention may be practiced in the form of compact fiber optic cables 70,80 (FIGS. 5 and 6) including strength assemblies 30 having one or more strength members 72,82 coated with a water swellable material as described above, and at least partially nested in respective recesses 33,35 of tubes 73,83 which support the strength members. Recess 33 of cable 70 tightly receives strength members 72, and strength member 82 may be at least partially embedded in recess 35 of cable 80. For ease of optical fiber access, for example, strength members 72,82 may include a controlled distinct bonding layer 75,85 comprising one or more suitable plastics having moderate adhesion characteristics, which layers 75,85 bond the strength members 72,82 to the recesses in the tubes but are intended to permit separation therefrom when a craftsman applies sufficient removal action to the strength member. Once the strength member 72,82 has been separated from tube 73,83, the respective recesses 33,35 define a frangible, narrowed tube section 71,81 where the craftsman can break the tube section for access to the optical fibers. The nesting of strength members 72,82 in respective recesses of tubes 73,83 diminishes the size contribution of the strength members and advantageously results in a relatively compact configuration of cables 70,80. As in the first embodiment of the present invention, fiber optic cables 70,80 each respectively include a first jacket 74,84, a waterblocking layer or tape 79,89, an armor tape 76,86, and a second jacket 78,88. Extrusion of first jackets 74,84 and second jackets 78,88 assures, as in the first embodiment of the present invention, coupling of the components with a minimum of gaps for enhanced crush performance. Ripcords 77,87 are provided to assist in the removal of the cable components.

The invention may be practiced in the form of a fiber optic cable 100 that includes the features and advantages of the embodiment of FIGS. 1–2 described above, but jacket 34 comprises the exterior of the cable. Cable 100 includes strength assemblies 30, supported by a core tube 13, having strength members 32, and may include ripcords 17 therebetween. Waterblocking yarns 15 may be obviated by or in addition to the water swellable coating as described above. Additionally or as an alternative, cable 100 may include strength members 32', 72,82, as described above; and/or tube 13 may include recesses 33 and/or 35. Like the embodiment of FIG. 7, the present invention may be practiced in the form of the embodiments disclosed in FIGS. 4–6 with strength assemblies 30 comprising only one jacket, the jacket comprising the exterior surface of the cable and may be in contact with the tube and strength members.

The present invention has thus been described with reference to the foregoing embodiments, which embodiments are intended to be illustrative of the present inventive concepts rather than limiting. Persons of ordinary skill in the art will appreciate that variations and modifications of the foregoing embodiments may be made without departing from the scope of the appended claims. Polyethylene and Polyvinylchloride are the preferred jacketing materials but other suitable materials may be used as well.

What is claimed is:

1. A fiber optic cable comprising:
   at least one optical fiber in a tube;
   strength assemblies respectively comprising at least one strength member in contact with a jacket and adjacent said tube, said at least one strength member is coated with a water swellable material; and
   at least one ripcord generally aligned with a bending axis of said cable and generally in contact with at least one of said strength members, whereby crush loads applied to said cable create stresses therein which flow to said jacket and to said strength members.

2. The fiber optic cable of claim 1, wherein said strength members are arranged to impart a preferential bend resistance to said optical cable.

3. The fiber optic cable of claim 1, wherein a water swellable material is disposed between said strength members and said tube.

4. The fiber optic cable of claim 3, wherein the water swellable material comprises a water swellable tape.

5. The fiber optic cable of claim 1, wherein at least one of said strength members is generally non-circular.

6. The fiber optic cable of claim 1, wherein at least one of said strength members includes an arcuate surface shape that is generally complementary to an arcuate surface shape of said tube.

7. The fiber optic cable of claim 1, wherein said strength members is at least partially nested in a respective recess of said tube.

8. The fiber optic cable of claim 1, wherein said strength members are longitudinally disposed.

9. The fiber optic cable of claim 1, wherein said strength members are formed of a metallic material.

10. The fiber optic cable of claim 1, wherein said strength members are formed of a coated steel.

11. The fiber optic cable of claim 1, wherein said strength members are formed of a dielectric material.

12. The fiber optic cable of claim 1, wherein said water swellable coating bonds to said jacket.

13. The fiber optic cable of claim 1, wherein at least one of said strength assemblies includes at least two strength members coupled to each other.

14. The fiber optic cable of claim 13, wherein said at least two strength members are coupled to each other with a waterblocking substance.

15. The fiber optic cable of claim 1, wherein said jacket is pressure extruded.

16. The fiber optic cable of claim 1, wherein said jacket is substantially bonded to and surrounds at least about half of an exterior radial surface of one of said strength members.

17. The fiber optic cable of claim 1, wherein said jacket is tightly coupled to said at least one strength member with a minimum of gaps therebetween.

18. The fiber optic cable of claim 1, wherein the cable further comprises an armor tape generally surrounding said jacket and a second jacket generally surrounding said armor tape.

19. The fiber optic cable of claim 18, wherein a waterblocking layer is disposed between said jacket and said second jacket.

20. The fiber optic cable of claim 18, wherein said armor tape comprises plastic.

21. The fiber optic cable of claim 18, wherein said armor tape comprises metal.

22. A fiber optic cable comprising:
   at least one optical fiber in a tube;
   strength assemblies each respectively comprising at least two longitudinally disposed strength members generally in contact with each other;
   at least a first jacket surrounding said tube, at least some of said strength members generally in contact with said at least first jacket; and
   at least one ripcord disposed generally between two of said strength members of a strength assembly and generally longitudinally aligned with said strength members.

23. The fiber optic cable of claim 22, wherein said strength members are generally non-circular.

24. The fiber optic cable of claim 22, wherein said strength members include an arcuate surface shapes that are generally complementary to an arcuate surface shape of said tube.

25. The fiber optic cable of claim 22, wherein at least one strength member is at least partially nested in a respective recess of said tube.

26. The fiber optic cable of claim 22, wherein said at least one ripcord is generally in contact with at least one of said strength members.

27. The fiber optic cable of claim 22, wherein said at least one strength member is coated with water swellable material.

28. The fiber optic cable of claim 22, wherein at least one of said strength assemblies includes at least two strength members coupled together by a waterblocking substance.

29. The fiber optic cable of claim 22, wherein said jacket is pressure extruded.

30. The fiber optic cable of claim 22, wherein said jacket is substantially bonded to and surrounds at least about half of said strength members.

31. The fiber optic cable of claim 22, wherein said jacket is tightly coupled to said strength members with a minimum of gaps therebetween.

32. The fiber optic cable of claim 22, wherein said strength assemblies define a non-preferential bend type cable.

33. The fiber optic cable of claim 22, wherein assemblies define a preferential bend type cable.

34. The fiber optic cable of claim 22, wherein a water swellable material is disposed between said strength member and said tube.

35. The fiber optic cable of claim 34, wherein the water swellable material comprises a water swellable tape.

36. The fiber optic cable of claim 22, wherein the cable further comprises an armor tape generally surrounding said first jacket and a second jacket generally surrounding said armor tape.

37. The fiber optic cable of claim 36, wherein a water-blocking layer disposed between said first and said second jackets.

38. The fiber optic cable of claim 36, wherein said armor tape comprises plastic.

39. The fiber optic cable of claim 36, wherein said armor tape comprises metal.

40. The fiber optic cable of claim 22, wherein said strength members are formed of a metallic material.

41. The fiber optic cable of claim 22, wherein said strength members are formed of a coated steel.

42. The fiber optic cable of claim 22, wherein said strength members are formed of a dielectric material.

* * * * *